United States Patent
Fink et al.

[11] Patent Number: 5,876,827
[45] Date of Patent: Mar. 2, 1999

[54] PILE CARPET

[75] Inventors: Wilbert E. Fink, Villanova, Pa.; Jean-Claude Auguste, Dayton, Tenn.

[73] Assignee: Polyloom Corporation of America, Dayton, Tenn.

[21] Appl. No.: 871,500

[22] Filed: Jun. 9, 1997

Related U.S. Application Data

[63] Continuation-in-part of Ser. No. 239,317, May 6, 1994, abandoned, and a continuation-in-part of Ser. No. 696,462, Aug. 14, 1996, Pat. No. 5,728,444, which is a continuation of Ser. No. 179,321, Jan. 10, 1994, Pat. No. 5,578,357, which is a division of Ser. No. 64,380, May 21, 1993, Pat. No. 5,288,349, which is a division of Ser. No. 833,093, Feb. 10, 1992, Pat. No. 5,240,530.

[51] Int. Cl.$^6$ ............................................. B32B 3/02
[52] U.S. Cl. ................................... 428/95; 428/97
[58] Field of Search ........................... 428/95, 97

[56] References Cited

U.S. PATENT DOCUMENTS

| | | |
|---|---|---|
| Re. 31,826 | 2/1985 | Machell . |
| B 501,415 | 1/1976 | Taft et al. . |
| 3,309,259 | 3/1967 | Schwartz ................................ 428/95 |
| 3,390,035 | 6/1968 | Sands . |
| 3,537,946 | 11/1970 | Truax et al. ........................... 156/72 |
| 3,551,231 | 12/1970 | Smedberg . |
| 3,554,824 | 1/1971 | Callahan ................................ 156/79 |
| 3,562,373 | 2/1971 | Logrippo . |
| 3,583,936 | 6/1971 | Stahl . |
| 3,640,786 | 2/1972 | Carpenter ............................ 156/72 |
| 3,653,803 | 4/1972 | Hammer . |
| 3,676,280 | 7/1972 | Sands . |
| 3,887,737 | 6/1975 | Baxter et al. ......................... 428/95 |
| 3,928,281 | 12/1975 | Uchigaki et al. .................... 260/42.39 |

(List continued on next page.)

FOREIGN PATENT DOCUMENTS

| | | |
|---|---|---|
| 13972/92 | 10/1992 | Australia ............................. 428/95 |
| 0 518 014 A1 | 12/1992 | European Pat. Off. . |
| 2 105 137 | 8/1972 | Germany . |
| 47-28438 | 7/1972 | Japan . |
| 51-47166 | 4/1976 | Japan . |
| 61-119 780 | 6/1986 | Japan . |
| 61-193829 | 8/1986 | Japan ............................ 156/244.11 |
| 3-030 877 | 2/1991 | Japan . |
| 60-109 806 | 3/1991 | Japan . |
| 971958 | 10/1964 | United Kingdom . |
| 2 067 135 A | 7/1981 | United Kingdom . |
| WO 91/01221 | 2/1991 | WIPO . |
| WO 93/12285 | 6/1993 | WIPO . |

OTHER PUBLICATIONS

Janet Herlihy, "Is Carpet Hazardous to Our Health?," Carpet & Rug Industry, Oct. 1990, pp. 32, 34 & 53.
Rexene® Polypropylene Resins, El Paso Products Company
Rexene® Injection Molding "A"® .

(List continued on next page.)

*Primary Examiner*—Terrel Morris
*Attorney, Agent, or Firm*—Burns, Doane, Swecker & Mathis, L.L.P.

[57] ABSTRACT

The disclosure relates to a carpet product, a process for manufacturing carpet, and an apparatus used in a carpet manufacturing process. The carpet product is made from tufted polymer filament yarn and includes a sheet of extruded polypropylene, integrally fused to the individual yarn filaments of the yarn back loops. The yarn fibers are substantially all secured to the integrally fused sheet so that the carpet resists fuzzing. The process includes providing a carpet base having a primary backing penetrated by yarn, applying heat to the underside of the base, extruding a heated sheet of polymer and continuously contacting the heated extruded sheet of polymer with the base thereby integrally fusing the base to the extruded sheet. The apparatus includes a source of carpet precursor, a heated cylinder for heating the underside of the carpet, an extruder and a casting roll against which the extruded sheet and heated carpet are pressed.

19 Claims, 7 Drawing Sheets

U.S. PATENT DOCUMENTS

| | | |
|---|---|---|
| 3,940,525 | 2/1976 | Ballard . |
| 3,975,224 | 8/1976 | Ruzek et al. . |
| 3,982,051 | 9/1976 | Taft et al. . |
| 4,028,159 | 6/1977 | Norris ................. 156/94 |
| 4,035,533 | 7/1977 | Chambley . |
| 4,086,381 | 4/1978 | Cheshire et al. ............ 428/113 |
| 4,140,071 | 2/1979 | Gee et al. ................. 428/95 |
| 4,158,646 | 6/1979 | Benkowski et al. . |
| 4,234,366 | 11/1980 | Brewer et al. . |
| 4,336,286 | 6/1982 | Tomarin ................. 428/95 |
| 4,508,771 | 4/1985 | Peoples, Jr. et al. . |
| 4,522,857 | 6/1985 | Higgins . |
| 4,576,665 | 3/1986 | Machell . |
| 4,624,878 | 11/1986 | Evans et al. ............. 156/72 X |
| 4,663,370 | 5/1987 | Marvel, Sr. et al. . |
| 4,705,706 | 11/1987 | Avery ................. 156/72 X |
| 4,763,604 | 8/1988 | Frain, III et al. ............ 428/95 |
| 4,844,765 | 7/1989 | Reith . |
| 4,875,954 | 10/1989 | Griffiths et al. . |
| 5,109,784 | 5/1992 | Lepe-Cisneros .......... 156/72 X |
| 5,130,069 | 7/1992 | Tietz et al. . |
| 5,240,530 | 8/1993 | Fink ................. 156/94 |
| 5,256,224 | 10/1993 | Gillyns et al. ............ 428/85 |
| 5,283,097 | 2/1994 | Gillyns et al. ............ 428/95 |
| 5,288,349 | 2/1994 | Fink ................. 156/72 |
| 5,317,070 | 5/1994 | Brant et al. ............ 526/348.5 |
| 5,370,757 | 12/1994 | Corbin et al. ............ 156/72 |
| 5,380,574 | 1/1995 | Katoh et al. ............. 428/92 |
| 5,494,723 | 2/1996 | Erren et al. ............. 428/97 |
| 5,538,776 | 7/1996 | Corbin et al. ............ 428/97 |
| 5,578,357 | 11/1996 | Fink ................. 428/97 |
| 5,728,444 | 3/1998 | Fink ................. 428/95 |

OTHER PUBLICATIONS

Amorphous Polypropylene, Crowley Chemical Company, New York, NY.

Eastman® Amorphous Polyolefins, Publication GN–386, Oct. 1988.

A. Addedo and A. Pellegrini, *Mehrschichtiger PP–Belag für Autoböden*, Chemiefasern/Textilindustrie Man–Made Fibers, vol. 41, No. 10, Oct. 1991, pp. 1235–1236.

(Translation) A. Addedo and A. Pellegrini, "*Multilayer Polypropylene Covering for Auto Floors,*" pp. 1–5.

Fibertex/Dow, *The TWO–in–ONE System*, Tifcon Presentation 1994, 20 pages.

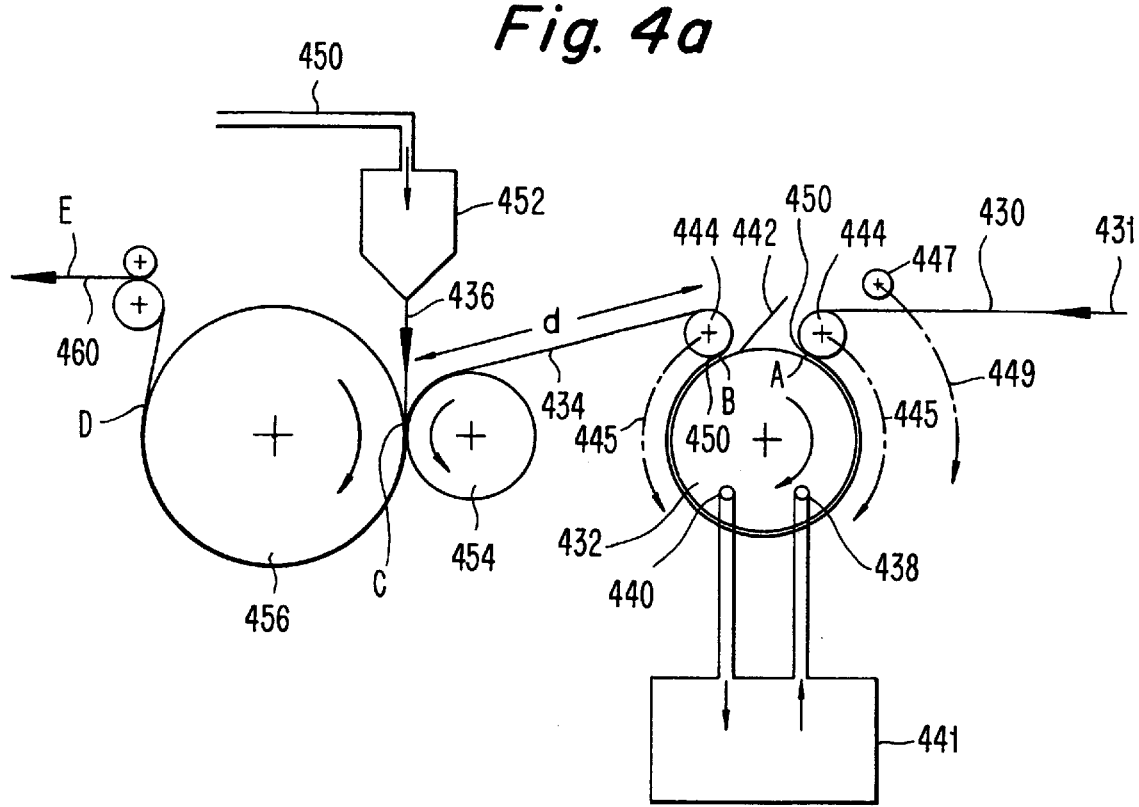

PILE CARPET

RELATED APPLICATIONS AND PATENTS

This application is a continuation-in-part of application Ser. No. 08/696,462, filed Aug. 14, 1996, now U.S. Pat. No. 5,728,444, which is a continuation of application Ser. No. 08/179,321, filed Jan. 10, 1994, now U.S. Pat. No. 5,578,357, which is a division of Ser. No. 08/064,380, filed May 21, 1993, now U.S. Pat. No. 5,288,349, which is a division of Ser. No. 07/833,093, filed Feb. 10, 1992, now U.S. Pat. No. 5,240,530, the contents of each of which are hereby incorporated by reference.

This application is also a continuation-in-part of application Ser. No. 08/239,317, filed May 6, 1994, now abandoned, the contents of which are hereby incorporated by reference. (International Publication No. WO95/30788, published Nov. 16, 1995).

FIELD OF THE DISCLOSURE

The application relates to pile carpet such as classified in class 428, subclass 85 and, in particular, to a carpet in which the face yarn is secured to one or more backing layers using an extruded sheet. Apparatus and methods for manufacturing such carpet are also disclosed.

BACKGROUND

Most carpets are composite structures in which the face fiber forming the pile, i.e., the surface of the carpet, penetrates at least one backing layer. The base portions of the facing yarn extend through the backing and are exposed on the bottom surface of the primary backing. Such carpets may be cut pile or loop pile. Aspects of the present invention are also applicable to woven or knitted carpets such as Berber carpets and certain sports surfaces.

The basic manufacturing approach to the commercial production of tufted carpeting is to start with a woven scrim or primary carpet backing and to feed this into a tufting machine or a loom. The carpet face fiber is needled through and embedded in the primary carpet backing thus forming a carpet precursor or base sometimes called griege goods. Upstanding loops on the upper side of the carpet may be cut to produce cut pile carpet. Yarn loops or knots are usually exposed on the underside of the griege goods.

Griege goods are typically backed with an adhesive coating in order to secure the face yarn to the primary backing. Low cost carpet often receives only a latex adhesive coating as the backing. This type of carpet is widely used in boats and is called marine backed carpet. Typically, the marine backed carpets are backed with a latex adhesive coating that is water and/or mildew resistant. Higher cost carpet often receives both a latex adhesive coating and a secondary backing.

The face fiber or yarn used in forming the pile of a tufted carpet is typically made of any one of a number of types of fiber, e.g., nylon, acrylics, polypropylene, polyethylene, polyamides, polyesters, wool, cotton, rayon and the like. Face yarns used in carpet include bulk continuous filament (bcf) yarns which are made up of tens or hundreds of individual fibers. Fibrillated polypropylene grass yarn is also often used as a face yarn.

Primary backings for tufted pile carpets are typically woven or non-woven fabrics made of one or more natural or synthetic fibers or yarns, such as jute, wool, polypropylene, polyethylene, polyamides, polyesters, nylon and rayon. Films of synthetic materials, such as polypropylene, polyethylene and ethylene-propylene copolymers may also be used to form the primary backing. Likewise, secondary backings for tufted pile carpets are typically woven or non-woven fabrics made of one or more natural or synthetic fibers or yarns.

The application of the latex adhesive involves coating the bottom surface of the thus formed griege goods with a latex polymer binder such as a styrene-butadiene copolymer. The coated griege goods are then passed through an oven to dry the latex adhesive coating. In this way the face fibers are attached to the primary backing by the latex binder.

It is known in the art to subject the back of greige goods to a gas flame to reduce the bulk of the protruding face yarn, particularly in greige goods with large knots, in order to reduce the amount of latex adhesive necessary to provide a smooth, well-covered surface. It is also known to apply pressure and low level heat (i.e. below yarn melting temperature) to flatten the knots prior to the application of the latex adhesive.

If desired, a secondary backing may be bonded to the undersurface of the primary backing. To produce tufted carpets with a secondary backing, the bottom surface of the griege goods is coated with a latex polymer binder. Thus, the secondary backing is applied to the coated bottom surface and the resulting structure is passed through an oven to dry the latex adhesive coating to bond the secondary backing to the griege goods.

The above-described methods have disadvantages in that they require a drying step and thus an oven to dry the latex polymer binder. The drying step increases the cost of the carpet and limits production speed. Furthermore, it has been reported that latex adhesive compositions generate gases that may be the cause of headaches, watery eyes, breathing difficulties and nausea, especially when used in tightly sealed buildings. See Herligy, *The Carpet & Rug Industry*, October 1990. In addition, overheating of the carpet may occur during drying of the latex which in turn may affect the shade of the carpet.

Consequently, carpet manufacturers have been attempting to develop a new approach for the preparation of tufted carpets. One new approach is the preparation of tufted carpets with a hot-melt adhesive composition instead of a latex composition.

Hot-melt adhesives are amorphous polymers that soften and flow sufficiently to wet and penetrate the backing surfaces and tuft stitches of carpets upon application of sufficient heat. Furthermore, hot-melt adhesives tend to adhere to the backing surfaces and/or tuft stitches. That is, hot-melt adhesives stick to backing surfaces and tuft stitches.

By the use of hot-melt adhesive, the necessity of drying the composition after application is eliminated and further, when a secondary backing material is desired, it can be applied directly after the hot-melt composition is applied with no necessity for a drying step.

Both latex adhesive based carpet and hot-melt adhesive based carpet have the disadvantage that they are not readily recyclable. Thus, large quantities of carpet trimmings and scrap produced during the manufacture of carpet and used carpet are sent to landfills. Consequently, carpet manufacturers spend a substantial sum on landfill costs. Such carpets are not recyclable after their useful life.

Thus, conventional carpet and carpet manufacturing processes have inherent problems. Specifically, the adhesives used to adhere the tufts of face fiber to the primary backing and to adhere the secondary backing to the primary backing include compositions which require lengthy drying times thus slowing down the manufacturing process. In addition, the latex compositions may produce noxious gases which create health hazards. Likewise, many of the hot-melt compositions conventionally employed in the manufacture of carpet do not result in reproducible consistency regarding scrim bonds, tuft pull strength and fuzz resistance. Finally, the use of conventional latex adhesives and hot-melt adhesives prevent carpet from being efficiently recycled.

In the original parent application Ser. No. 07/883,093, now U.S. Pat. No. 5,240,530, there is disclosed certain methods for producing carpet. According to the teachings of that application, a thermoplastic polymer sheet may be extruded into contact with griege goods to integrally fuse the primary backing, face yarn and extruded sheet. In a preferred embodiment the yarn, backings and extruded sheet are made of the same polymer, e.g. polypropylene. Cut pile carpet is presented as exemplifying the use of the methods. Trimmings, scrap and used carpet made in this fashion may be readily recycled because of their homogeneous chemical composition. No latex or adhesive application is required. Nor is a backing step required, though one may also be employed in some products.

Use of the techniques of the parent application have been found to present special problems when employed in the manufacture of loop pile carpet made with multi-fiber face yarns. In use, the closed loops of the carpets can be readily caught or snagged, for example by passing traffic. As a result long fibers may be pulled from the yarn leaving an undesirable surface fuzz after periods of wear.

It is known to test conventional carpets for integrity by the so-called fiberlock test using, for example, a QTE Fiberlock Tester manufactured by Quality Testing Equipment Dalton, Ga. The test and tester are often referred to as VELCRO® test and VELCRO® tester, respectively. VELCRO is a registered trademark for the well-known hook and loop fastening material. In this test, a two pound roller approximately three-and-a-half inches wide and one-and-a-half inches in diameter coated with VELCRO® hook material is rolled repeatedly over the loop pile of the carpet, for example, ten times. The carpet is then inspected for protruding fibers or fuzz. By "fuzz," it is meant short, individual filaments (often 1–3 stitch lengths long) removed from fiber bundles.

It is known that latex adhesives, if properly applied, can provide sufficient binding of carpet fibers to permit manufacture of loop pile carpets which can pass the fibertlock test or VELCRO® test. It is important that any proposal to replace the use of conventional adhesives be likewise capable of producing a carpet in which the face yarn or fibers are securely attached to the carpet, and, in particular, capable of producing loop pile carpet made with bcf face yarn which can pass the fiberlock test or VELCRO® test.

The present application includes disclosure of improved carpets and improved techniques for manufacturing carpet which retain various advantages of the carpets and methods initially disclosed in the original parent application.

SUMMARY OF THE DISCLOSURE AND OBJECTS

The present disclosure relates to a novel carpet product and method and apparatus for producing such a carpet. In preferred embodiments, the carpet may be readily recycled to provide input feedstock for the making of new carpet.

A preferred carpet is made entirely of the same isotactic or crystalline thermoplastic polymer, e.g. polypropylene. The face yarn is a bulk continuous filament yarn with multiple fibers. The yarn is tufted in a primary backing and laminated with a polymer sheet so that the yarn back loops, sheet and/or primary backing are integrally fused and so that substantially all the yarn fibers are secured in place.

It is an object of the present invention to provide a carpet made entirely of isotactic thermoplastic polymer in which the face yarn is securely fused to its backing.

It is another object of the present invention to provide a loop pile carpet made of recyclable thermoplastic polymer which is resistant to fuzzing when the pile is abraded.

It is another object of the present invention to provide a carpet made from isotactic thermoplastic polymer which has satisfactory tuft binding and lamination strength.

In accordance with preferred embodiments of the present invention a method is disclosed for making carpet in which a tufted, woven or knitted carpet precursor is provided. In a preferred embodiment the carpet precursor or carpet base comprises a primary backing penetrated by face yarn so that first portions of the yarn protrude from an upper side of the backing to form the pile of the carpet and so that knots or back loops of the yarn are exposed on the underside of the carpet base. Heat is applied to the underside of the carpet base. Advantageously this may be accomplished by pressing the carpet base against a heated roller whose surface is maintained at a temperature near or above the melting temperature of the face yarn or backing. A heated sheet of polymer may then be extruded onto the underside of the carpet base, thereby integrally fusing the yarn knots or back loops and the extruded sheet to form a carpet product. Scraps, trimmings and used carpet made by this process may be recycled as polymer feedstock for extrusion in making new carpet.

It is an object of the present invention to provide an improved process for manufacturing carpets made of thermoplastic polymers.

It is another object of the present invention to provide a process for manufacturing a recyclable carpet made entirely of thermoplastic polymers.

It is another object of the present invention to provide a process for manufacturing a carpet made from thermoplastic polymers which satisfies commercial requirements relating to resistance to fuzzing, yarn integrity, tuft binding and lamination strength.

The present disclosure also relates to carpet making machinery. In one embodiment carpet precursor is supplied to an arrangement of rollers including a fluid heated roller which is pressed against the underside of the carpet precursor. An extruder directly extrudes a hot thermoplastic sheet onto the heated underside of the carpet precursor. The laminate so formed is pressed against a cooled casting roll.

In an alternate embodiment of the present invention, a preformed sheet of thermoplastic polymer is simultaneously heated and laminated with carpet precursor in an apparatus including a continuous moving surface or belt. The belt is differentially heated so that it is relatively hot at the location where it first contacts the polymer sheet. The belt is moved and cooled so that it readily separates from the underside of the carpet after the carpet precursor and polymer sheet have been integrally fused.

Accordingly, it is an object of the present invention to provide machinery for producing a carpet from a carpet precursor fused with a polymer sheet.

These and other objects and features will be apparent from the detailed descriptive material which follows.

BRIEF DESCRIPTION OF THE DRAWINGS

FIG. 4a is a side schematic view of an apparatus used in the making of carpet, employing a heated roller;

FIG. 4b is a pictorial view of an apparatus of the type described generally in connection with FIG. 2a;

DETAILED DESCRIPTION OF THE PREFERRED EMBODIMENTS

According to the present invention, a thermoplastic polymer sheet is laminated with a carpet precursor to form a carpet product with desirable physical properties. Generally, the carpet precursor is made of a face yarn which interpenetrates a backing or grid defining the plane of the finished carpet. The carpet precursor may be woven or knitted. In preferred embodiments, face yarn is tufted in a primary backing. The thermoplastic polymer sheet is laminated to the underside of the carpet precursor. A carpet product with excellent physical properties, which is capable of being recycled, may be made using the techniques and apparatus described as follows.

Figure 1:
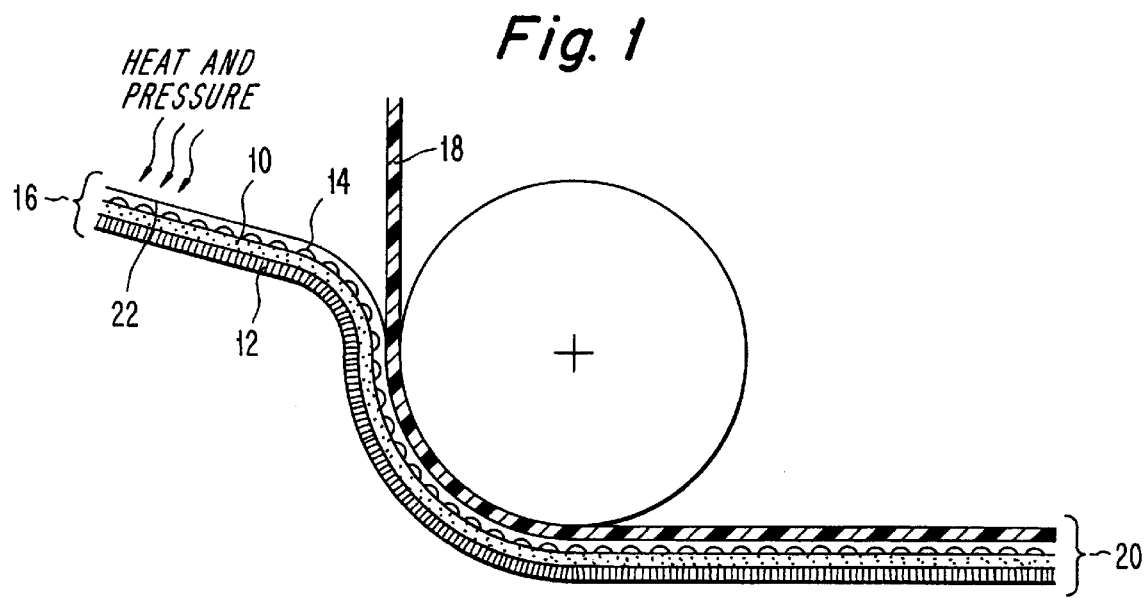
FIG. 1 is a cross-sectional view of a carpet being manufactured in accordance with a preferred embodiment of the present invention.

FIG. 1 illustrates some of the features of a carpet product of a preferred embodiment of the present invention. A primary backing layer is designated by the numeral 10. Face yarn is tufted in the primary backing forming a yarn pile 12 on the upper side of the carpet and back loops or knots 14. The tufted primary backing 16 is referred to here as the carpet precursor, carpet base or griege goods. On the left-hand side of FIG. 1, the carpet face yarn is loosely secured to the backing 10 by the tufting process to a degree sufficient for movement of the precursor for further processing, but the precursor is not sufficiently mechanically stable for use as a finished carpet.

The precursor is laminated with a polymer sheet 18 to form the carpet product 20. Advantageously, the sheet is an extruded sheet of thermoplastic polymer. The carpet precursor is integrally fused with it.

IMPROVED METHODS AND APPARATUS FOR CARPET MANUFACTURE

With continued reference to FIG. 1, an improved method of making a carpet product is generally illustrated. Heat and pressure are applied (for example, by a heated roller) to the underside of the carpet precursor at location 22 sufficient to heat the underside to above the melting point of the constituent thermoplastic polymer. A heated sheet of thermoplastic polymer 18 is brought in contact with the heated carpet precursor at location 24 whereby the laminated carpet product 20 is produced. The carpet product may either be the finished carpet or subjected to further processing, e.g. application of additional backings.

FIGS. 2 and 3 illustrate, by way of example, two types of carpet products made in accordance with the teachings of the present invention. FIG. 2 relates to a cut pile, or grass carpet and FIG. 3 relates to a loop pile carpet with optional secondary backing.

Figure 3A:
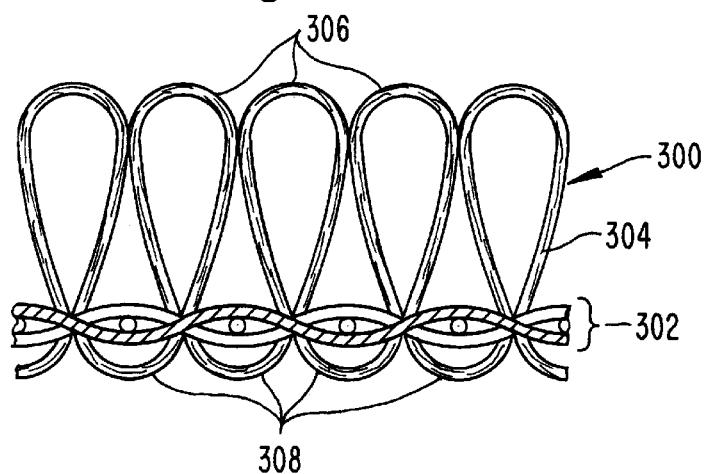
FIG. 3a is a cross-sectional view of a carpet precursor for a loop pile carpet.

FIG. 3a depicts a carpet precursor 200 from which a carpet, for example, grass carpet, is made. A woven primary backing 202 is interpenetrated by fibrillated isotactic polypropylene yarn 204. Cut yarn ends or tufts 206 form the pile of the carpet. The yarn is loosely secured in place by back loops 208 exposed on the underside of the carpet precursor. In this example the backing 202 is a woven fabric made of polypropylene.

Figure 2A:
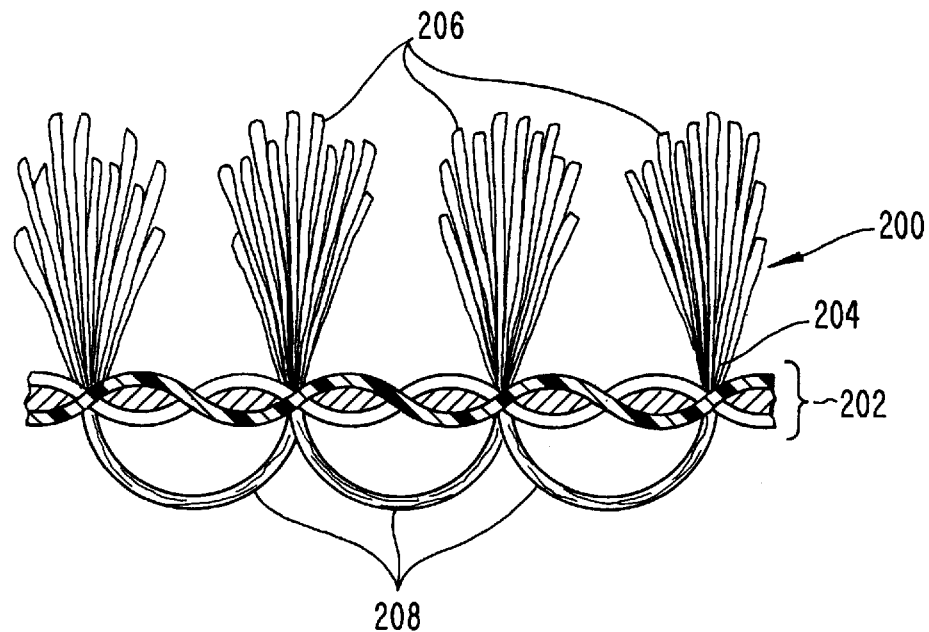
FIG. 2a is a cross-sectional view of a cut pile carpet precursor.
Figure 2B:
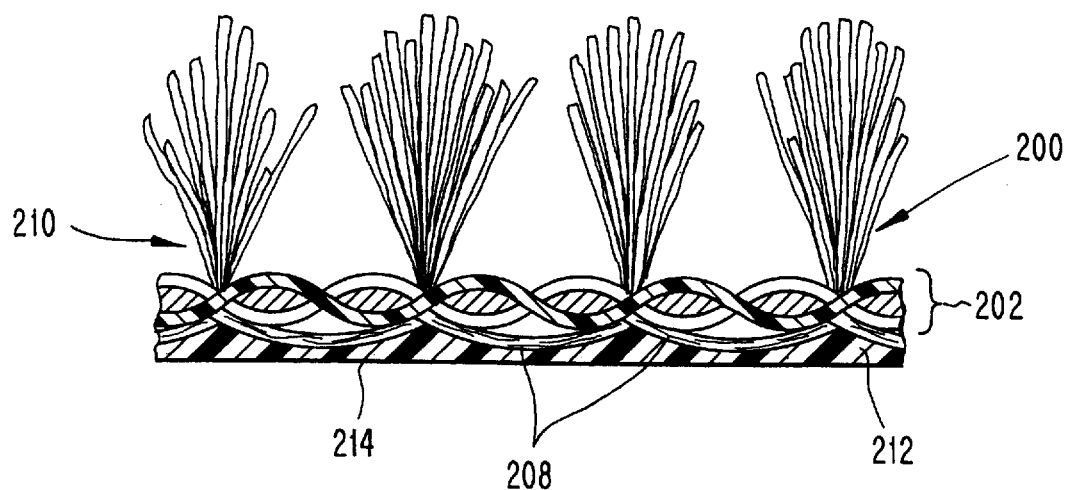
FIG. 2b is a cross-sectional view of a cut pile carpet made in accordance with the teachings of the present invention.

FIG. 2b depicts a carpet product 210 made from the carpet precursor of FIG. 2a. An extruded sheet 212 of polypropylene has been integrally fused to the carpet precursor 200. As shown in the figure the back loops 208 and portions of the backing 202 have been heat bonded with the extruded sheet 212. Spaces between the primary backing 202 and the extruded sheet 212 may be larger or smaller depending on the penetration of the extruded sheet material into the primary backing during manufacture. In fact, the extruded sheet may more or less conform to the shape of the bottom surface of the primary backing and encapsulate the back loops. Thus, there may be little, if any, space between the extruded sheet and the primary backing. The underside 214 of the carpet product may be essentially flat due to the cooling contact made with the surface of a casting roller during processing.

During manufacture the back loops 208 are partially melted, so that individual fibrils of the yarn are integrally fused with each other and with the extruded sheet and primary backing 202. This action is believed to enhance the mechanical durability of the resulting carpet product.

FIG. 3a depicts a carpet precursor 300 from which a level loop pile carpet is made. A woven primary backing 302 is interpenetrated by a multi-fiber face yarn or bulk continuous filament (bcf) yarn 304. Such yarn may be a twisted array of, for example, 120 small denier fibers. Yarn loops or tufts 306 form the pile of the carpet. The yarn is mechanically secured to the backing 302 by back loops 308 exposed on the underside of the carpet precursor. In this example the bcf yarn is made of polypropylene and the backing 302 is a woven fabric also made of polypropylene.

Figure 3B:
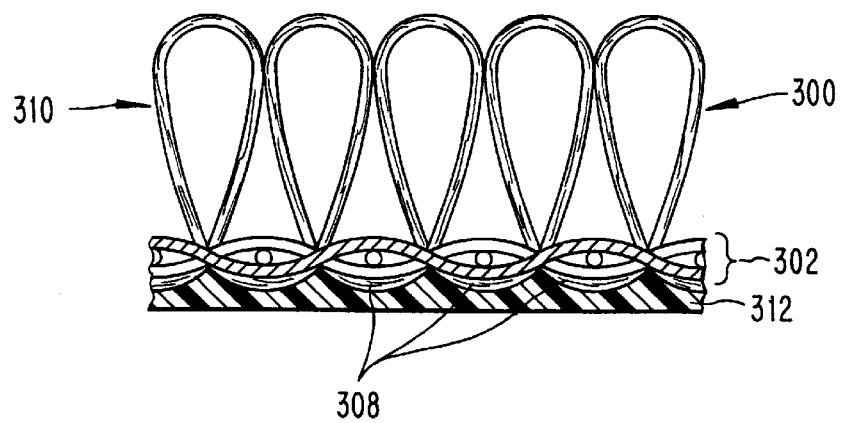
FIG. 3b is a cross-sectional view of a loop pile carpet made in accordance with the teachings of the present invention.

FIG. 3b depicts a carpet product 310 made from the carpet precursor of FIG. 7a. An extruded sheet 312 of polypropylene has been integrally fused to the carpet precursor 300. As shown in the figure the back loops 308 and portions of the backing have been heat bonded with the extruded sheet 312. As in the example of FIG. 2a some voids or spaces may occur between the extruded sheet and carpet precursor. Alternatively the upper portion of the extruded sheet may partially or totally encapsulate the back loops.

During manufacture the back loops 308 may be partially melted so that individual fibers making up the bcf yarn are integrally fused with each other and with extruded sheet and primary backing 302. It has been observed experimentally that preheating of the carpet precursor before contacting it with the hot extruded sheet improves the mechanical stability of the resulting carpet product and secures the tufts and component yarn fibers to a sufficient degree that the carpet product can pass the fiberlock test or VELCRO® test.

Figure 3C:
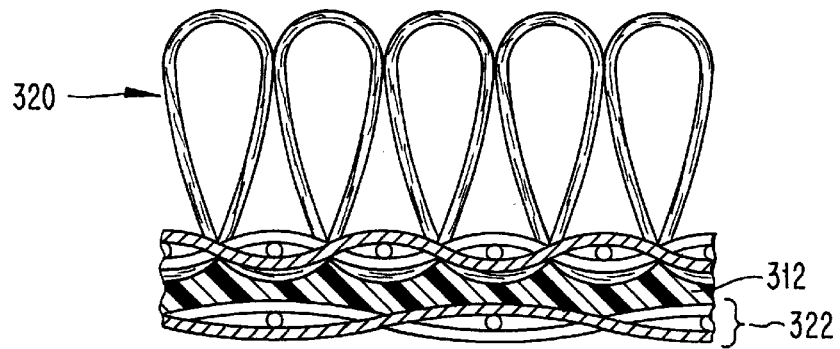
FIG. 3c is a cross-sectional view of a loop pile carpet with secondary backing made in accordance with the teachings of the present invention.

FIG. 3c depicts a carpet product 320 including an optional secondary backing 322. In this example, the secondary backing is laminated with the hot extruded sheet 312 and integrally fused with it.

Figure 4B:
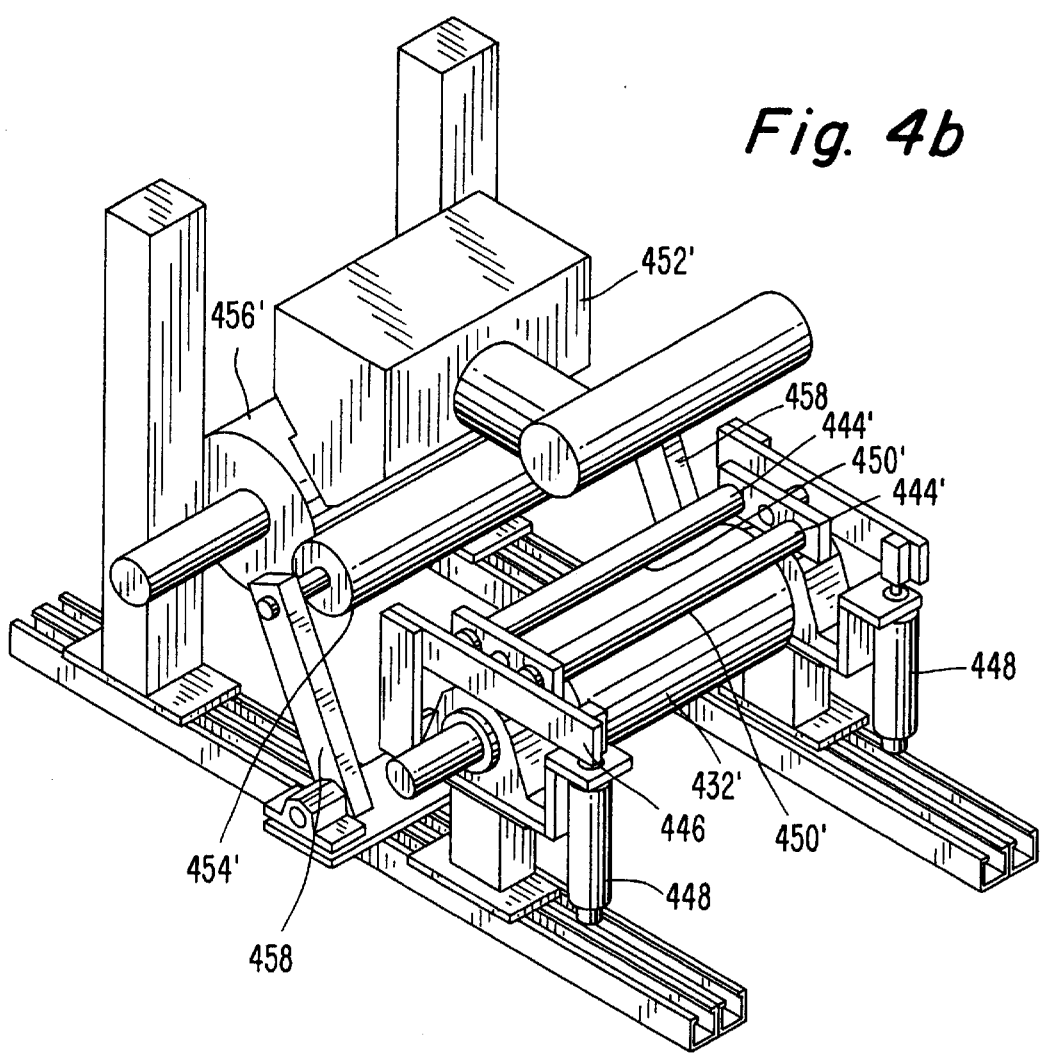

An apparatus for producing a carpet product is illustrated in FIGS. 4a and 4b. Carpet precursor or griege goods 430 are supplied at location 431 with the carpet pile facing downwardly. The carpet precursor is placed in contact with a heated roller 432, whereby the underside of the carpet precursor is heated. This results in heating of the back loop or knots of the carpet precursor which may be partially melted. The heated carpet precursor 434 travels downstream in the apparatus for lamination with a thermoplastic polymer sheet 436.

The heated roller 432 may advantageously be a fluid or oil heated roller although other means may be employed to uniformly heat the surface of the roller such as electrical resistance elements. When heated fluid is employed, the fluid enters the system at 438 (while shown in FIG. 4a off-center, the fluid inlet is typically at the center of the roll), is circulated in the roller 432 and exits at 440 (while shown in FIG. 4a off-center, the fluid outlet is typically at the center of the roll). The oil is reheated and recirculated in a closed loop system designated generally by numeral 441. Advantageously, the system is operated to maintain the surface of the roller 432 at a uniform temperature across the width of the roller. The optimum surface temperature of the roller is dependent on a number of variables including the structure and composition of the carpet precursor, line speed, roller pressure and the area of the contact between the roller 432 and the carpet precursor. In the system illustrated in FIG. 4, the roller 432 is 5.9 inches in diameter. The surface of the roller may be maintained between 330° F. and 650° F. or even higher and preferably between 400° F. and 500° F. At a line speed of about 10 feet per minute, the preferred roller surface temperature was about 400° to 450° F. using certain common carpet precursors as described in greater detail in the examples below.

The roller 432 may be provided with a surface or coating which resists sticking. In the system illustrated in FIG. 4, the roller 432 is wrapped with teflon tape. A doctor blade 442 may be provided to remove built-up polymer melted from the underside of the carpet precursor.

Water cooled nip roll 444 may be provided which, together with the tension in the running carpet precursor, hold the underside of the carpet precursor against the heated roller. With reference to FIG. 4b, which shows some additional aspects of the apparatus of FIG. 4a in perspective view, the heated roller and auxiliary rollers are designated 432' and 444', respectively. The auxiliary rollers 444' are rotatably mounted to a pivoting bar assembly 446. The pressure of the carpet precursor against the heated roller is controlled by applying pressure to the pivoting bar assembly 446 by means of hydraulic actuators 448. The pressure at nips 450 and 450' have been desirably controlled to provide a contact pressure at a tangential point between the nip rolls 450 and 450' and chill roll 432 of between 1 and 4 pounds per linear inch of width with a gap setting between the respective rolls prior to introducing the carpet precursor of between zero and one inch. The contact pressure and gap setting will depend upon the thickness and density of the carpet precursor. In the apparatus of FIG. 4, the hydraulic pressure may typically be set at 460 to 480 pounds per square inch to obtain the desired contact pressure at the recited gap setting.

Referring once more to FIG. 4a, the rollers 444 may be mounted so that their axes of rotation can be selectively positioned along lines 445. An additional roller 447 may be provided, whose axis of rotation may be selectively positioned along line 449. During line start-up, rollers 44 and 47 may be moved downwardly so that the path of the greige goods 430 is located out of contact with the heated roller 432, to thereby prevent overheating of the greige goods as it is being threaded into the line. In addition, during operation, the location of rollers 444 along lines 445 may be adjusted to vary the heat input into the greige goods. Thus, the heated roller temperature can be maintained constant and the wrap angle (i.e. residence time) of the greige goods adjusted for line parameter variations such as greige goods weight.

As shown in FIG. 4a, the heated carpet precursor 434 travels a short distance "d" to be laminated with the polymer sheet 436. Advantageously, this distance is as short as possible to minimize heat loss from the carpet precursor. The heated carpet precursor 434 may contact the heated polymer sheet directly extruded downwardly onto the underside of the carpet precursor. The sheet is formed by forcing a polymer feedstock 50 through an extrusion die 452. In examples discussed below, the extrusion die temperature is about 510° F. It is desirable that the extruded sheet be above its melting temperature when it contacts the carpet precursor, advantageously 100° F. or more above the melting temperature.

The extruded sheet and carpet precursor together pass between nip roll 454 and casting or chill roll 456. As shown in FIG. 4b, the nip roller 454' may be rotatably mounted on parallel pivoting arms 458. The nip roller and pivoting arms exert a pressure against the upper side of the carpet precursor which consequently presses the extruded sheet against the casting roller 456'. A contact pressure at a tangential point between the nip roller 454 and the chill roller 456 of between 1 and 4 pounds per linear inch of width with a gap setting between the respective rolls prior to introducing the carpet precursor of between zero and one inch has been desirably utilized. The contact pressure and gap setting will depend upon the thickness and density of the carpet precursor. Advantageously, the casting roller is maintained at a controlled temperature. In the examples discussed below, that temperature is 130° F.

A carpet product 460 is produced which may be subjected to additional processing. Optionally a secondary woven backing or co-extruded backing (not shown) may be simultaneously laminated to the extruded sheet 436 at the casting roll 456.

In order to control shrinking of the carpet precursor or carpet product, a tenter frame (not shown) may be employed during the preheating and lamination operations or thereafter.

Various polymers have been extruded or laminated onto carpet precursors. Trials have been conducted using polypropylene homopolymer (prime virgin 5 mils), polypropylene copolymer (recycled from shrink film), polypropylene homopolymer (recycled from fiber), and thermoplastic elastomer polypropylene blend (50/50 blend). In all the trials, the extruded sheet exhibited good bonding strength to the back of the carpet. The griege goods used in the trials included a polypropylene primary backing with polypropylene face fiber and a polypropylene primary backing with nylon face fiber. In addition, certain carpet trials included a secondary backing of woven polypropylene. The secondary backing was found to exhibit good adhesion with all the polymer types listed.

The extrusion trials were conducted with a 1.5 inch diameter, 24:1 (barrel length to diameter ratio), Sterling extruder. The extruder had a 20 horsepower DC drive and a single stage screw. The extruder was equipped with three heating zones, a screen pack collar and a pressure gauge. Speed was controlled by a variable resistor dial and a tachometer was connected to an RPM dial for speed indication. Typical extruder temperatures range from 340° F. to 580° F. and pressures from 1000–3000 psi. Typical die melt temperatures range from 450–580° F.

The apparatus used in the examples described below included a heated roller of the type shown in FIG. 4. In that apparatus, the die width was 12 inches. The molten polymer from the die was deposited on a water cooled casting roll (7.9 inch diameter, 13 inch width). Water was passed through helical passages within the casting roll at high velocity to cool the casting roll as required. The nip roll was 3 inches in diameter. The casting roll assembly was driven by an eddy current clutch and a 1.5 horsepower motor.

While speeds of 10 feet per minute were actually used in the examples described below, it is contemplated that higher speeds would be used in commercial production. In particular, since there is no drying step, speeds of 100 to 300 feet per minute appear possible. Carpet widths of 12 to 15 feet may be produced. Such speeds and widths require appropriate material and handling capability to move large rolls in and out of the process quickly. Thus, in contrast to conventional processes, the factor limiting line speed may be material handling and not the conventional adhesive drying step, which is eliminated in the practice of the present method.

contains plots of temperature at three depths, w1, w2 and w3, which are respectively 2 mils, 6 mils and 14 mils into the backside of the carpet base. The simulation is based on the following assumed properties and parameters:

| Material | = | polypropylene with a melting point of 325° F. |
|---|---|---|
| Line Speed | = | 20 ft per minute |
| Ambient temperature | = | 90° F. |
| Temperature of melt at extrusion die | = | 480° F. |
| Temperature of casting roller | = | 100° F. |
| Temperature of heated roller surface | = | 420° F. |
| Cast roller diameter | = | 5.9 in. |
| Cast roller wrap angle | = | 200° |
| Heated roller diameter | = | 5.9 in. |
| Heated roller wrap angle | = | 220° |
| Average specific heat of polypropylene | = | 0.46 BTU/lb/°F. |
| Average thermal conductivity of polypropylene | = | 0.143 BTU-ft/hr/ft$^2$/°F. |

The times indicated as A, B and C correspond to the similarly labeled locations in the apparatus of FIG. 4a. More specifically, time A corresponds to t=o, time B corresponds to t=t, (the time at which the carpet base leaves the heated roller), and time C corresponds to t=t$_2$ (the time when the extruded sheet first comes into contact with the carpet base. The time t$_3$ is the time when the carpet product leaves the cast roller.

The following table presents a summary of simulations, including the simulation described in connection with FIG. 5(b), which is labeled Example 5 in the table.

| Example | Sheet thickness (mils) | Heated Teflon Coated Roll Temp (°F.) | Wrap Angle on Prefuse Roll | Time t$_1$ (sec.) | Time t$_2$ (sec.) | Time t$_3$ (sec.) | Prefusion Temp. (°F.) Between t >, t, and t < t$_2$ Point | | | Temp. After (t2) (Maximum) (°F.) Point | | | Temp. at (t3) (°F.) Point | | |
|---|---|---|---|---|---|---|---|---|---|---|---|---|---|---|---|
| | | | | | | | w1 | w2 | w3 | w1 | w2 | w3 | w1 | w2 | w3 |
| 1 | 10 | 120 | 90 | 1.158 | 2.658 | 5.233 | 120 | <120 | <120 | 390 | 300 | 220 | 250 | 240 | 205 |
| 2 | 10 | 420 | 90 | 1.158 | 2.658 | 5.233 | 400 | 350 | 260 | 450 | 400 | 305 | 270 | 260 | <260 |
| 3 | — | 420 | 90 | 1.158 | 2.658 | 5.233 | 400 | 350 | 260 | No Extruded Sheet | | | 155 | 140 | 120 |
| 4 | 5 | 420 | 90 | 1.158 | 2.658 | 5.233 | 400 | 350 | 260 | 430 | 370 | 275 | 195 | 205 | 205 |
| 5 | 5 | 420 | 220 | 2.832 | 4.332 | 6.906 | 405 | 380 | 320 | 430 | 380 | 320 | 195 | 215 | 230 |

Figure 5A:
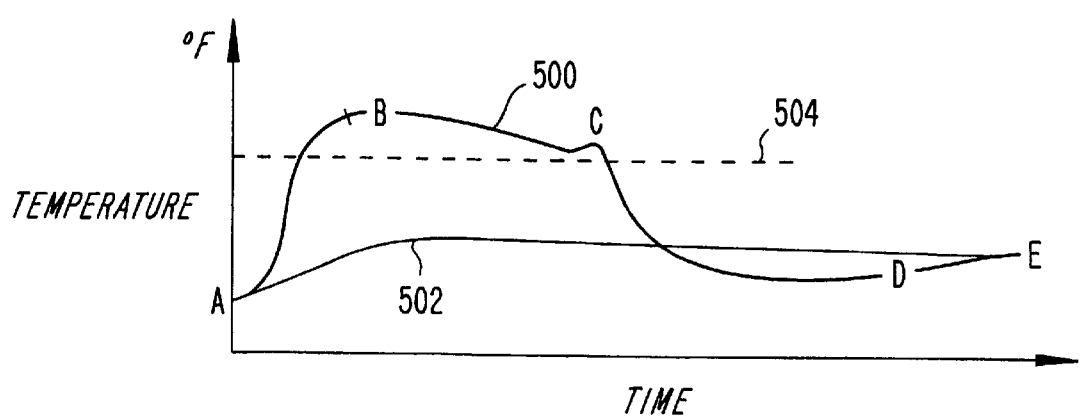
FIGS. 5a and 5b are graphs illustrating the estimated temperatures of carpet components as a function of time for the apparatus of FIGS. 2.
Figure 5B:
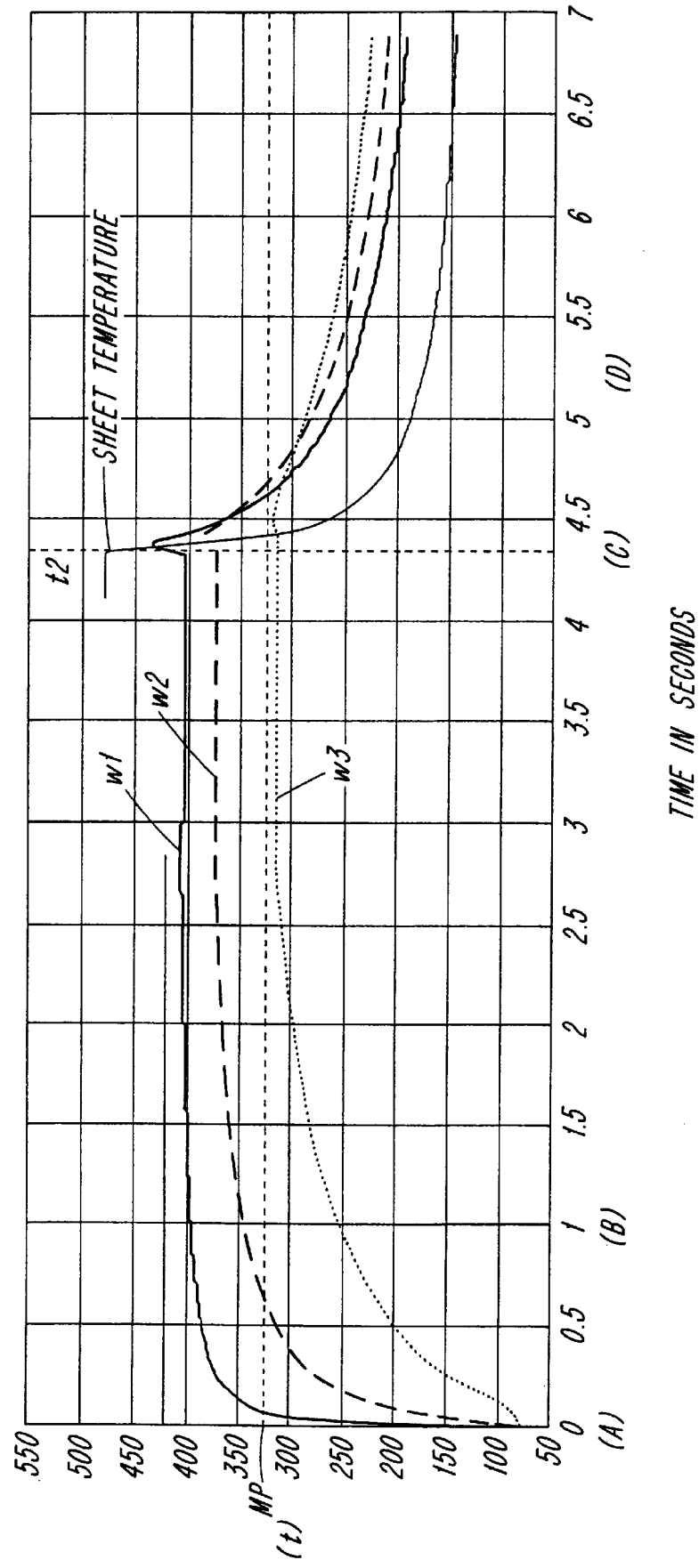

FIG. 5a presents a calculated temperature profile for the apparatus of FIG. 4 in graphical form. Temperature is represented on the vertical axis; time/position is represented on the horizontal axis. Trace 500 represents the back loop temperature at various points in the process designated by letters A though E which correspond to similarly labeled locations in the apparatus of FIG. 4(a). Trace 504 represents the carpet face temperature at the points A though E of FIG. 4(a). The dotted line 504 represents the melting temperature of the back loop yarn. FIG. 5a illustrates a temperature profile in which the back loops are maintained above their melting temperature, while the temperature of the carpet face always remains below the melting temperature.

The temperature of the carpet product at various depths (w) as a function of time (processing stage) has been simulated. FIG. 5b is an example of such a simulation, and Examples 1 and 2 compare a simulated process with and without heat being applied to the heated roller. Example 3 illustrates the effect on the simulation of eliminating the extruded sheet. Examples 4 and 5 employ a 5 mil extruded sheet and compare the process for a heated roll or wrap angle of 90° (Example 4) and 220° (Example 5). Examples 1 through 4 have a cast roller wrap angle of 90°. As indicated above, Example 5 has a cast roller wrap angle of 200°.

The examples illustrate how process parameters may be used to control the internal temperatures of the carpet product at various depths to achieve melting of yarn fibers and integral fusing of yarn fibers with each other and with the extruded sheet and primary backing, without thermally degrading the face yarn or primary backing during processing.

The carpet base of preferred embodiments of the present invention is a woven polypropylene primary carpet backing.

Typically this backing is woven from isotactic polypropylene tapes (tape thickness 1.0 to 2.0 mils). These tapes are machine direction oriented to arrive at tensile strengths in the 4 to 6 grams per denier range. Orientation of the polymer involves organization of the crystalline structure by controlled heating; stretching and cooling during production. This process makes it possible to produce a backing strong enough for the end carpet use. However, the backing cannot be heated for too long to a temperature above the original orientation temperature (240° to 280° F.) without damaging the orientation of the polymer. If the orientation is lost substantially throughout the tape thickness, the strength of the backing will be compromised.

Likewise, polypropylene face yarn may be made from oriented isotactic polypropylene. The face yarn cannot be heated for too long at a temperature above the original orientation temperature (240° to 280° F.) without damaging the orientation of the tufted yarns that make up the carpet face fiber. The preferred embodiment of the present invention quickly melts the back surface of the primary backing and limited portions of the tufted yarn, then quickly cools the carpet base to control the temperature profile to avoid appreciable shrinkage of the carpet base, degradation of the strength of the backing, or damage to the protruding portions of the yarn pile.

It will be clear from the foregoing that variable wrap angles may be used at a constant line speed to change the internal carpet temperatures without changing the apparatus temperature settings or the process speed. The process response to a wrap angle change is relatively instantaneous. The process response to apparatus temperature setting and line speed changes is much slower (i.e., it takes a relatively long time to reach the desired equilibrium process temperature at points w1, w2, and w3).

This feature is very important, particularly for a commercial carpet manufacturer who must routinely make many varieties of carpet (e.g. often the same carpet style will be offered in one color line but at three different face fiber weights or qualities). In such case, adjustment of the wrap angles can provide the necessary heat adjustment (to accommodate the three different face weights) on the fly. Likewise, adjustment of wrap angles may facilitate start-up of a line and avoid burning through the carpet base when the line runs initially at a slow speed.

While adjustment of line speed and process temperature settings may be used, the temperatures w1, w2 and w3 reach equilibrium much more slowly and involve more complicated interactions.

Figure 6:
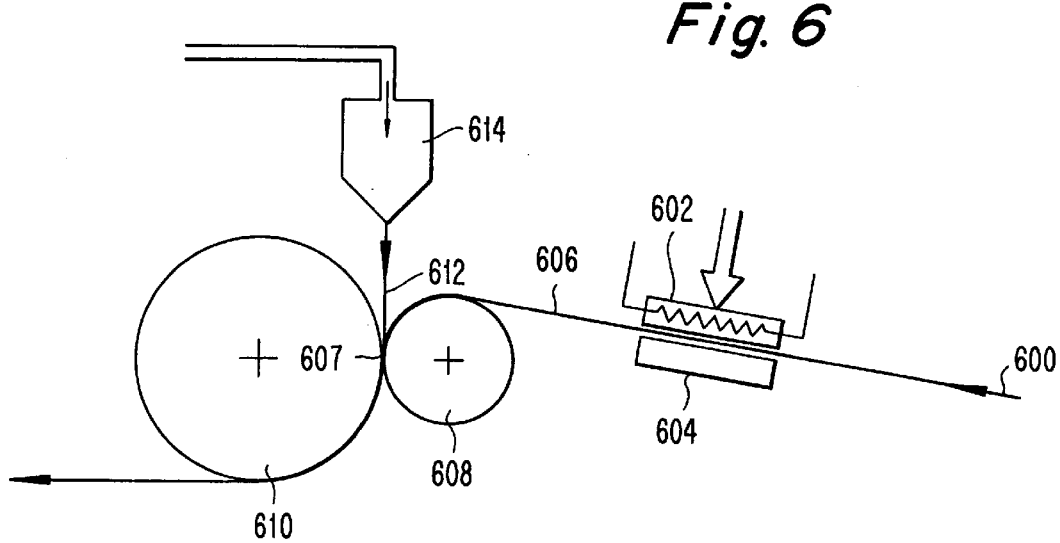
FIG. 6 is a side schematic view of an apparatus used in the making of carpet, employing a heated plate.

FIG. 6 is a schematic side view of an alternative embodiment of the present invention. The underside of a carpet precursor 600 is passed in contact with an electrically heated plate 602. The carpet precursor 600 may be pressed between the electrically heated plate 602 and a second plate 604 whose temperature is not controlled. Successful trials of the apparatus have been run where the surface temperature of the plate 604 was set at 600° F. Alternatively, a radiant heater (not shown) may be substituted for the heated plate 602.

With continuing reference to FIG. 6, heated carpet precursor 606 is drawn to the nip 607 formed between nip roller 608 and casting roller 610. A polymer film 612 is extruded directly onto the underside of the heated carpet precursor from extrusion die 614. Casting roll temperatures between 80° and 120° F. have been employed. Pressure of between 50 to 70 psi at the nip 607 have been employed.

Temperature variations across the heated plate 602 have been observed to produce variation across the width of the carpet product. Cool areas produce regions in loop pile bcf carpet which fail the fiberlock test or VELCRO® test. Hot areas produce regions of apparent excess shrinkage and face yarn damage. In addition, the hot areas may deposit excessive melted polymer onto the heated plate.

Figure 7:
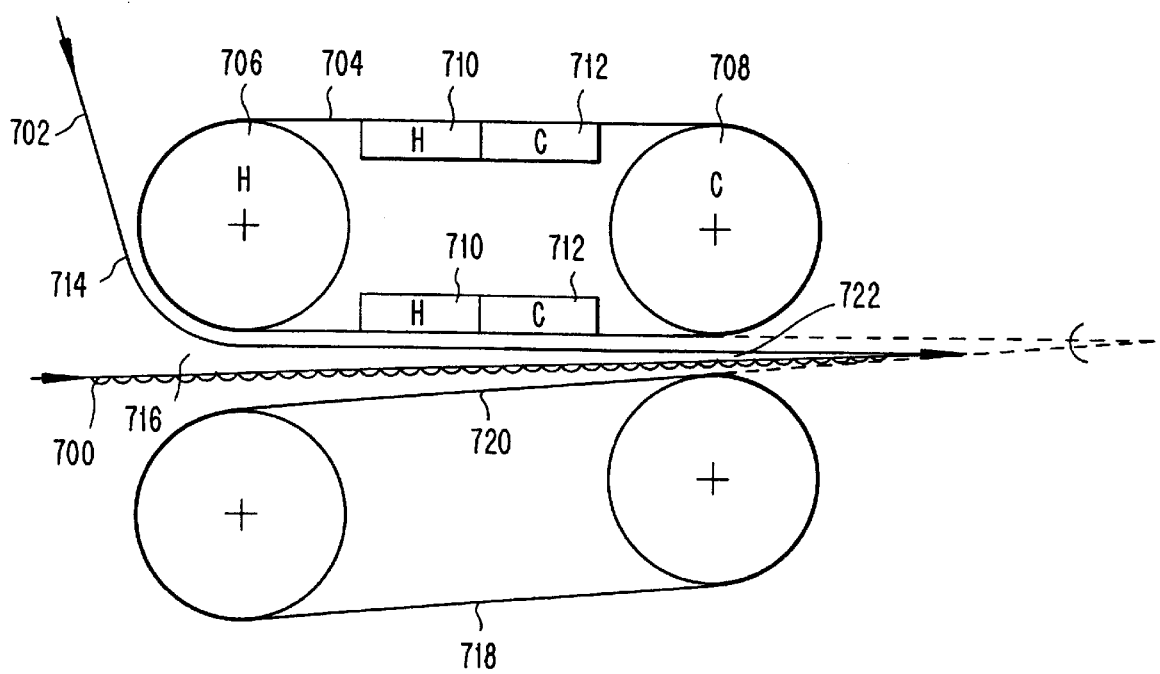
FIG. 7 is a side schematic view of an apparatus used in making carpet employing a continuous, temperature-controlled surface.

FIG. 7 is a schematic side view of another embodiment of the present invention. In FIG. 7 a carpet precursor 700 is supplied to the apparatus, pile side down. A sheet 702 of polymer is also supplied to the apparatus. The sheet 702 may either be freshly extruded in a manner similar to that described above, or it may be formed at a different time and/or location and supplied from a feed roll.

The apparatus of FIG. 7 includes a first differentially heated and cooled surface 704. The surface functions both as a heated surface for integrally fusing the polymer sheet 702 to the carpet precursor 700 and as a casting surface for forming and cooling the underside of the carpet product.

In preferred embodiments of the present invention the surface 704 is a continuous belt, which travels around heated cylinder 706 and cooled cylinder 708. Stationery, heating and cooling units 710 and 712 respectively, may also be provided to adjust the temperature profile around the path of travel of the belt 704.

In operation, the belt is differentially heated so that it is relatively hot at location 114 where it first contacts the polymer sheet 702. At a downstream location 716 the heated polymer sheet contacts the carpet precursor, the combination of which is moved and cooled as the belt travels from left to right in FIG. 7.

A lower continuous belt system 718 may be provided for applying pressure to the upper side of the carpet product. An upper surface 720 of the lower belt may be oriented at an angle with respect to the upper belt as illustrated in order to gradually increase the pressure exerted on the carpet product. The temperature of the lower belt 718 may also be controlled in a manner similar to belt 704, albeit at lower temperatures.

At location 722 the carpet product and belt are sufficiently cool that the carpet product readily separates from the belt without leaving significant amounts of melted polymer (preferably no melted polymer) on the belt 704. From this location the carpet product travels downstream in the production line.

CARPET PRODUCTS

FIG. 1 illustrates a preferred embodiment of the present invention: a carpet product including a face yarn and a backing material integrally fused with an extruded sheet of polymer.

More specifically, preferred embodiments of the carpet may comprise a primary backing, face yarn protruding from a top surface of the primary backing, and an extruded sheet of a thermoplastic polyolefin polymer integrally fused to back loops or knots of the face yarn and/or to the bottom surface of the primary backing. The fused portions of the carpet product are the result of a heat bond between the carpet precursor and the extruded sheet during the manufacturing process. Likewise, there may be a mechanical bond between the primary backing, the extruded sheet and face yarn, resulting from the thermoplastic polyolefin polymer flowing between and around the fibers making up the primary backing, and the face yarn.

The carpet product of the present invention may also include one or more secondary backing layers integrally fused to the carpet precursor by an extruded polymer sheet.

Various materials generally suitable for the carpet products of the claimed invention are disclosed in parent U.S. Pat. No. 5,288,349, incorporated by reference herein.

In one preferred embodiment, the face yarn, backings and extruded sheet comprise the same thermoplastic polymer. Preferably the thermoplastic polymer is an isotactic polyolefin polymer, especially an isotactic polypropylene homopolymer, random impact or block copolymer or terpolymer.

In another embodiment the backings and extruded sheet are formed of one polymer and the face yarn is formed of a different polymer. For example, the backing and extruded sheet are formed of an isotactic polyolefin polymer and the face yarn is formed of nylon or polyester, or of natural materials such as cotton or wool. In other embodiments, some or all of the backing may be formed from such materials. It is preferred, however, to use a polymer with melting points similar to that of the extruded sheet to facilitate integral fusing with the extruded sheet.

In some carpets the bottom layer (either the extruded sheet or secondary backing) may be formed from a blend of thermoplastic polyolefin polymer and thermoplastic elastomer to provide some properties of the elastomer such as flexibility, non-skid character and other properties similar to rubber.

The primary backing of the carpet product may include any synthetic resin that will integrally fuse with the extruded sheet and may be, for example, a woven or non-woven fabric, a film or a web. Preferably, the primary backing is made of a thermoplastic polyolefin polymer, copolymer or terpolymer.

The secondary backing material, if applied, may preferably include any synthetic resin that will integrally fuse with the extruded sheet. Advantageously, the secondary backing will comprise the same thermoplastic polyolefin polymer, copolymer or terpolymer as the primary backing. Optionally, the secondary backing for the carpets of the present disclosure is a woven or non-woven fabric. Likewise, the secondary backing may be an open weave or leno weave, i.e., tape yarn in the warp direction and spun staple fiber in the fill direction. However, the open weave or spun staple warp is not necessary to obtain a suitable bond as may be required with use of a latex adhesive.

The extruded sheet may be formed from a substantially crystalline or isotactic, thermoplastic polyolefin polymer, copolymer or terpolymer. A preferred thermoplastic polyolefin polymer is isotactic polypropylene homopolymer. The polymer may be a commercial isotactic polypropylene which is polymerized to a 90 to 98% isotactic content, with the remaining polymer being in the randomly ordered atactic configuration. The degree of isotacity can be further enhanced by post-reaction solvent extraction of the atactic polypropylene. Both commercial and purified grades of isotactic polypropylene are suitable for use in the extruded sheet of the present invention.

Isotactic polypropylene is suitable for use in the extruded layer since it has a relatively specific melting point (about 330° F.) and a relatively specific recrystallization point (about 300° F.). Atactic or amorphous polypropylene has no specific melting or recrystallization point. Thus, amorphous polypropylene is difficult to integrally fuse to either the primary backing, face fibers, or secondary backing. Furthermore, the tensile strength of the isotactic polypropylene is approximately 28 to 40 times stronger than the tensile strength of the atactic polypropylene. Thus, the extruded sheet does not require the presence of atactic polyolefin to provide the requisite bond strength between the primary backing, tufts of face fiber or secondary backing. In addition, due to the tensile strength of the isotactic polyolefin, carpets with increased delamination strength may be made.

In addition to homopolymer, other classes of polypropylene are commercially available and may be suitable for use in the extruded sheet. These include polypropylene random copolymers, impact or block copolymers, and terpolymers.

The isotactic polypropylene or other crystalline olefin used in the extruded layer may be compounded with inert fillers by either extrusion compounding or mixing operations. Such fillers may include calcium carbonate, silicates, talc, calcium, glass fibers, carbon black and wood flour. Other fillers may be suitable.

The use of such fillers in the extrusion layer may range from about 0.1% to as high as about 50%. At the high levels, an exceedingly stiff board like material may be made that may be used, e.g., as a trunk liner, molded floor mat or a door panel in an automobile. Since addition of a filler significantly alters the performance and process ability of the polymer, filled systems may be designed to satisfy a particular product need with minimum effect on other performance aspects.

It is desirable that, for some use applications, carpet made in accordance with the present invention pass the "pill test" (ASTM D-2859) for fire resistance. Thus, in some applications where enhanced flame resistance is required, a fire-retardant may be added to the feedstock used to produce the extruded sheet.

Optionally, blends of polyolefins and thermoplastic elastomers may be used to make the extruded sheet or co-extruded layer. The thermoplastic elastomers (TPE's) are a diverse family of rubber-like materials that, unlike vulcanized rubbers, may be processed and recycled as thermoplastics. However, the TPE's are not merely substitutes for thermosetting polymers, they may also replace or improve their properties. There are four general groups of TPE's that may be suitable for use in the present invention. The four general groups include polyurethanes, copolyesters, styrenic block copolymers, and polyolefins. Blending the elastomer with the polyolefin polymer provides some of the properties of the elastomer at a lower cost. The compatibility is good for blends ranging from about 10 to 97% elastomer based on the total amount of thermoplastic polymer and elastomer.

As a class, the TPE's may provide toughness, flexibility over a wide temperature range, and resistance to abrasion, weathering, and a variety of solvents and other chemicals. Thus, the properties of each of the materials in the group may be tailored for use in the carpet of the present invention by polymerization methods, blending, and incorporation of additives, fillers, and reinforcements to form carpets having enhanced abrasion, weathering and chemical resistance.

GRASS CARPET EXAMPLES

An apparatus substantially as shown and described in connection with FIG. 4 was employed to produce grass carpet of the general structure shown and described in connection with FIG. 2b. The face yarn is fibrillated film tape fiber made from polypropylene homopolymer with a denier of 3800 and a fibrillation count of 13–17 per tape. The primary backing is a 24×13 plain weave backing with 24 tapes in the warp direction per inch and 13 tapes in the fill direction per inch. The tapes are made from homopolymer polypropylene. The weight of the primary backing is 3.3oz/square yard. The parameters of the examples are set out in the following table.

| Example | Pre-heat Roll Temp. (°F.) | Pre-heat Nip Pressure (PSI) | Extruded Film Thickness (mils) | Average Tuft Bind Strength (pounds) |
|---------|---------------------------|-----------------------------|--------------------------------|-------------------------------------|
| A | 400 | 60 | 10 | 3.84 |
| B | 400 | 60 | 10 | 5.10 |
| C | 400 | 80 | 10 | 5.18 |
| D | 430 | 80 | 10 | 6.25 |
| E | 440 | 60 | 5 | 4.51 |
| F | 440 | 60 | 10 | 5.72 |
| G | 440 | 60 | 10 | 5.87 |
| H | 440 | 80 | 10 | 4.35 |
| I | 450 | 80 | 10 | 5.02 |

The average tuft bind strength measurements were made in accordance with ASTM D-1335.

Examples A–I were run at a line speed of about 10 feet per minute. The extruded melt temperature was measured to be 600° F. in the case of Example A and 625° in the case of Examples B through I. Examples A, B and F employed a polypropylene homopolymer having a nominal melt flow of 80. Examples C–E and G–I employed a ethylene/propylene copolymer having a nominal melt flow of 3.5.

Two comparative examples were run, which omitted the preheating step. The results are reported below.

| Example | Extruded Film Thickness (mils) | Average Tuft Bind Strength (pounds) |
|---------|-------------------------------|-------------------------------------|
| J | 10 | 1.65 |
| K | 10 | 1.46 |

These examples employing a polypropylene homopolymer having a nominal melt flow of 80 exhibited a lower tuft bind strength.

BCF LOOP PILE CARPET EXAMPLES

An apparatus substantially as shown and described in connection with FIG. 4 was employed to produce bcf loop pile carpet of the general structure shown and described in connection with FIG. 3b. The face yarn is a bulk continuous filament yarn made from polypropylene homopolymer. The yarn has a total denier of 2750 with 120 ends in the fiber bundle. The primary backing is as described above. The parameters of the examples are set out in the following table.

| Example | Pre-heat Roll Temp. (°F.) | Pre-heat Nip Pressure (PSI) | Extruded Film Thickness (mils) | Average Tuft Bind Strength (pounds) |
|---------|---------------------------|-----------------------------|--------------------------------|-------------------------------------|
| L | 440 | 60 | 10 | 6.76 |
| M | 440 | 80 | 10 | 5.68 |
| N | 450 | 80 | 10 | 5.74 |

All three samples passed the fibertlock test or VELCRO® test and had acceptable tuft bind strength as indicated. Example L employed a polypropylene homopolymer having a nominal melt flow of 80. Examples M and N employed an ethylene/propylene copolymer having a nominal melt flow of 3.5.

From the foregoing description, one of ordinary skill in the art can ascertain the essential characteristics of the present invention, and without departing from the spirit and scope thereof, can make changes and modifications of the disclosed techniques to adapt them to various uses and conditions. As such, these changes and modifications are properly within the scope of the range of equivalents of the following claims.

We claim:

1. A loop pile carpet comprising:
   a polypropylene primary backing;
   a polypropylene bulk continuous filament yarn made up of plural fibers, said yarn being tufted in said primary backing and having back loops on the underside of the primary backing; and
   a sheet of polypropylene integrally fused with said back loops, so that substantially all the yarn fibers are secured in place.

2. The carpet of claim 1, wherein the yarn back loops are compressed between the primary backing and the polypropylene sheet.

3. The carpet of claim 1, further comprising a secondary backing integrally fused to the polypropylene sheet.

4. The carpet of claim 1, wherein the carpet has a tuft bind strength of at least 4 pounds.

5. The carpet of claim 1, wherein the sheet of polypropylene is integrally fused with both the back loops and the primary backing.

6. A recyclable, tufted pile carpet product which resists fuzzing, comprising:
   a primary backing made of isotactic polyolefin;
   a face yarn made of plural, small denier isotactic polyolefin fibers in a fiber bundle, said yarn being tufted in said primary backing and having back loops on the underside of the primary backing; and
   an extruded sheet of isotactic polyolefin, between 5 and 10 mils in thickness, upper portions of which surround said back loops, the individual fibers of the back loops being integrally fused with each other and with said sheet to secure the fibers in the carpet product.

7. The carpet product of claim 6, wherein the lower surface of the isotactic polyolefin sheet is cast.

8. The carpet product of claim 6, wherein the denier of the yarn is less than 3000.

9. The carpet product of claim 8, wherein the carpet product is a loop pile carpet product, wherein the yarn fiber bundles contain about 100 fibers and wherein the carpet passes the fiberlock test.

10. The carpet product of claim 6, wherein the yarn back loops are compressed between the primary backing and the crystalline polyolefin sheet.

11. The carpet product of claim 6, wherein the isotactic polyolefin is a polypropylene homopolymer; random, impact or block copolymer; or terpolymer.

12. The carpet product of claim 6, wherein an upper portion of the extruded sheet envelopes the back loops on the underside of the primary backing.

13. The carpet product of claim 6, wherein the fibers comprising the yarn protruding on the upper side of the primary backing are unfused.

14. An improved loop pile carpet product having components made of the same crystalline polyolefin including a primary backing, extruded sheet and tufted bulk continuous filament yarn, wherein the individual filaments in the yarn are bonded to each other and with said sheet so that the carpet product passes the fiberlock test; as manufactured by a process comprising the steps of: tufting the primary backing with the bulk continuous filament yarn to form a carpet base with portions of the yarn protruding from the upper side of the primary backing and with back loop portions of the yarn exposed on the underside of the primary backing; pressing the underside of the carpet base against a heated roller to heat and compress the back loop portions of the yarn, wherein the pressure and temperature of the heated roller are sufficient to heat and deform, in cross-section, the back loop portions of the yarn; extruding molten crystalline polyolefin directly onto the underside of the carpet base, whereby the interior of the back loop portions reach the melting temperature of the crystalline polyolefin and portion of substantially all the fibers in the back loops fuse with each other and with said sheet; and moving the carpet product against the surface of a casting roller, cooled to a controlled temperature, to rapidly cool melted portions of the carpet base below their melting point before the carpet base is thermally degraded.

15. The carper product of claim 14, wherein the extruded sheet is 5 to 10 mils in thickness and comprises isotactic polypropylene.

16. The carpet product of claim 14, wherein the crystalline polyolefin comprises isotactic polypropylene and wherein the heated cylindrical surface is maintained at a temperature of about 440° F. or more, and the extruded sheet is 100° F. or more above its melting temperature when it contacts the carpet base.

17. The carpet product of claim 14, wherein the yarn back loops and extruded sheet are integrally fused.

18. The carpet product of claim 14, wherein the yarn back loops, extruded sheet and primary backing are integrally fused.

19. A tufted recyclable carpet product having a primary backing and face yarn made of crystalline polyolefin and an extruded sheet between 5 and 10 mils in thickness made of crystalline polyolefin, said carpet product having a tuft bind strength of at least 4 pounds, as manufactured by a process comprising the steps of: tufting the primary backing with the face yarn to form a carpet base with back loop portions of the yarn exposed on the underside of the primary backing; pressing the underside of the carpet base against a heated roller to compress the back loop portions of the yarn and partially melt the yarn without degrading the carpet base; extruding molten crystalline polyolefin directly onto the underside of the carpet base, whereby the yarn back loops are integrally fused with said sheet; and cooling the underside of the carpet base before the carpet base is thermally degraded.

* * * * *